United States Patent
Kumar

Patent Number: 6,066,285
Date of Patent: May 23, 2000

[54] SOLID FREEFORM FABRICATION USING POWER DEPOSITION

[75] Inventor: Ashok V. Kumar, Gainesville, Fla.

[73] Assignee: University of Florida, Gainesville, Fla.

[21] Appl. No.: 09/209,870

[22] Filed: Dec. 11, 1998

Related U.S. Application Data

[60] Provisional application No. 60/069,583, Dec. 12, 1997.

[51] Int. Cl.[7] ................................................. B29C 35/08
[52] U.S. Cl. ........................... 264/439; 264/317; 264/497; 264/603; 425/174.8 E; 425/363
[58] Field of Search ..................... 264/317, 439, 264/497, 603; 425/174.8 E, 363

[56] References Cited

U.S. PATENT DOCUMENTS 4,961,154  10/1990  Pomerantz et al. .................. 264/401 X Primary Examiner—Leo B. Tentoni
Attorney, Agent, or Firm—Thomas C. Saitta

[57] ABSTRACT

A solid freeform fabrication process and apparatus for producing three dimensional parts using layer-by-layer deposition of support powder and part compositional powder, where the deposition is accomplished using electrophotographic powder deposition technology to create a three-dimensional green part. Each successive loose powder layer is deposited directly onto the previously deposited powder layer, which has been compacted or fused to its underlying layer. After all powder layers have been deposited the green part is further processed such that the part compositional powder is fused to create a high-density part while the support powder is easily removed.

28 Claims, 3 Drawing Sheets

SOLID FREEFORM FABRICATION USING POWER DEPOSITION

This application claims the benefit of the United States provisional application filed Dec. 12, 1997, and assigned Ser. No. 60/069,583.

BACKGROUND OF THE INVENTION

This invention relates generally to the field of Solid Freeform Fabrication (SFF), also known as Rapid Prototyping, which is characterized by a layer-by-layer build-up to produce three dimensional parts or objects. In particular, this invention relates to an SFF process and apparatus for producing three dimensional parts using layer-by-layer deposition of a powder directly onto a previously laid layer of powder, where the deposition is accomplished using electro-photographic powder deposition technology to create the three-dimensional part.

SFF is a new manufacturing technique which is characterized by a layer-by-layer build-up of matter to form three-dimensional objects, which makes it possible to create significantly more complex objects in one fabrication step than previously possible. In addition, due to the relatively simple process planning required, the potential has been demonstrated to automatically fabricate a part under computer control given a solid model of the part. SFF technology was first used to create prototypes of designs for visualization and testing purposes. The trend is to develop SFF methodologies which can be used to directly produce actual parts, tools or molds of precise dimension and optimum physical properties rather than rough prototypes.

Several different technologies for SFF have been developed in recent years. The technologies are referred to as stereolithography, 3-D printing, selective laser sintering, laminated object manufacturing, fused deposition modeling, ballistic particle manufacturing, shape deposition manufacturing and laser-engineered net-shaping. The earliest developed SFF technique is stereolithography, which builds a part by solidifying a liquid photopolymer using a laser beam. Parts are constructed layer-by-layer by hardening the photopolymer using a laser beam that is projected in the shape of the cross-section of the part. A disadvantage of stereolithography is that it is limited to parts which can be constructed of photopolymers. Extensions of this technique are being developed for use with ceramics and other materials.

Fused deposition modeling (FDM) involves depositing ABS plastic, wax, certain elastomers or similar material by melt extrusion through a nozzle. The environment is temperature controlled so that the deposition material solidifies quickly upon extrusion. To construct complex shapes with overhanging features, support structures must be utilized both in FDM and stereolithography. These support structures must be subsequently removed manually. Ballistic particle manufacturing (BPM) uses a piezo-electric jetting system to deposit droplets of molten thermoplastic to form an object, and this technique likewise requires the use of support structures. The BPM jet head is mounted on a 5-axis positioning mechanism and controlled by software.

Shape deposition manufacturing (SDM) integrates material deposition and material removal. Layers of part material are deposited and machined to net shape before additional material and further layers are deposited. Microcasting, a welding process, is used to deposit molten metal droplets for creating fully dense parts. In each layer, the part material is deposited in the shape of the part cross-section and the remaining area is covered using a support material which is etched away after the part is complete. For example, stainless steel parts may be manufactured by SDM using copper as the support material.

Laminated object manufacturing (LOM) builds parts by gluing foils or sheets of material on the top of one another. A laser beam is used to cut the sheet into the desired shape of the cross-section. The material is stored as rolls of sheet material which is unwound and routed over a platform on which the part is built. Sheet material is glued to the layers below by a heated roller. The laser beam then cuts the desired cross-section of the part. The material that is to be removed is cut into a cross-hatched pattern to facilitate removal.

Selective laser sintering (SLS) is a powder based process which requires no support structures to create complex shapes. A thin layer of powder is deposited in a workspace container and heated to just below its melting point. The powder is then fused together using a laser beam that traces the shape of the desired cross-section. The process is repeated by depositing successive layers of powder and fusing each layer. The area that is not sintered remains as a loose powder that can be easily removed after all the layers have been deposited and fused. Previously deposited powder provides the support for any overhanging features of the part geometry. Typically, the position of the laser beam is controlled by a scanning mirror and the powder is deposited in a cylindrical workspace which has a moving base or platform, which is lowered after each layer of powder is deposited. The powder is deposited in uniform layers using a powder leveling roller. Suitable powder materials include polycarbonates, investment casting wax, PVC, ABS plastic and nylon. A wider range of materials can be used with the SLS system over the other techniques discussed above. A drawback is that additional powder at the boundaries is often hardened and remains attached to the part, thereby requiring additional finishing steps to remove the unwanted material. Furthermore, an inert atmosphere is required, increasing the cost of the equipment. Toxic fumes may be emitted from the powder material during processing.

The 3-D printing process has powder deposited in layers and selectively joined by a binder material. Ink-jet printing technology is used to print the binder in the shape of the cross-section of the part on each layer of powder. The powder is deposited on a platform which is lowered after each layer is deposited. After the whole part has been printed, heat treatment is required to consolidate the part. Regions where the binder was not deposited remain as loose powder which is removed after the heat treatment. This technology can be used with a wide variety of materials, and is currently used mainly to make ceramic molds for metal casting.

Freeform powder molding (FPM) is a dual powder method, one of which forms the part and the other of which is a support powder. The part powder is shaped by mixing it with an aqueous carrier, pouring it into a mold and freezing the mixture, removing the mold and surrounding the frozen part with a support powder. The combination is then sintered to create the finished part. Another method similar to this is disclosed in U.S. Pat. No. 5,555,481 to Rock et al., where powder is deposited in a layer-by-layer fashion, one powder acting as a mold or support for the other powder. The deposition technique is very crude and precision objects cannot be formed by this technique. The powder is simply gravity fed onto the previously deposited layer.

Laser-engineered net shaping (LENS), also known as direct light fabrication (DLF) or direct metal fabrication since its main application is in the construction of metal parts, builds three dimensional parts by delivering metal powder into the path of a high power laser beam. A Nd:YAG laser is used to melt an area on a metal substrate while a nozzle delivers the powder to the molten weld pool. The nozzle is stationary and the build platform is translatable over the X/Y plane. The method produces a metal bead, with successive layers built by adding beads on top of the previously deposited bead to define the part.

It is an object of the present invention to provide a novel SFF technique and apparatus which improves over the known SFF processes by providing for deposition of successive powder layers directly onto the previously deposited powder layer, by lowering equipment and processing costs, by eliminating the need to melt or bind the part material into a lamina prior to its deposition onto the previously deposited layer, by utilizing a secondary support powder to support a primary part powder which fuses or sinters to form the part at a temperature below the melt or fusion temperature of the secondary powder so that the support powder does not consolidate and is therefore easy to remove, by providing a method which can be used with a wide variety of powders, including polymers, ceramics, metals, alloys and mixed composition materials, whether conducting, non-conducting, magnetic or non-magnetic, by providing a method which produces high density, high strength and high toughness parts, by providing a method which allows the layer-by-layer composition to be altered to produce, for example, advanced metal matrix composites, fiber reinforced composites, parts with composition gradients, and parts with embedded circuits and electronics, and by providing a method which can deposit very fine powder precisely to create parts that have relatively small tolerances to produce precision parts and to create very small objects.

These and other objects, as more fully revealed below, are accomplished by providing a powder based solid freeform fabrication process and the apparatus for performing the process, where powder is deposited directly onto a previously deposited powder layer in successive layers corresponding to cross-sections of the three dimensional part using an electro-photographic deposition technique by charging the previously deposited powder layer opposite to the charge of the powder on the photoreceptor such that the attractive force of the powder to the previously deposited layer is greater than the attractive force to the photoreceptor means, resulting in the transfer of the powder onto the previously deposited layer.

SUMMARY OF THE INVENTION

The invention comprises a method, and the apparatus for accomplishing the method, of solid freeform fabrication (SFF) of a three dimensional object or part using layer-by-layer deposition of one or more powders or particles by electro-photographic deposition to define the three dimensional shape of the object. Each powder layer is deposited directly onto the previously deposited powder layer in the form of loose powder, with no need for pre-processing of the individual layers or to melt or sinter the material before depositing the loose powder layer onto the previously deposited layers.

The apparatus comprises an electro-photographic means to create a transferable powder layer on a photoreceptor transfer member, such as a drum or roller, and translate the image so as to contact an object building platform or previously deposited powder layer. The photoreceptor transfer member is charged such that the powder will adhere to its surface in a particular image. An object translation means such as an object building platform translates perpendicularly relative to the transfer plane to allow the object to be built up vertically layer-by-layer into the desired three dimensional shape. The object may be built with each layer being the same powder or with successive layers being different powders. Successive layers may be deposited directly onto the last deposited layer, or the images may be selected to occupy different areas of a plane so that plural successive depositions combine to form a single layer on the object. The object building platform also translates parallel relative to the transfer plane so that the last deposited layer may be processed by compaction, heat or the like to fuse the layer onto the previous layer.

DETAILED DESCRIPTION OF THE INVENTION

With reference to the drawings, the invention will now be described with regard for the best mode and the preferred embodiments. The invention is a solid freeform fabrication (SFF) method, and an apparatus for performing the method, of creating a three-dimensional object using electrophotography, layer-by-layer deposition of a powder in the configuration of the object or part, which is then treated to create a finished object.

Figure 1:
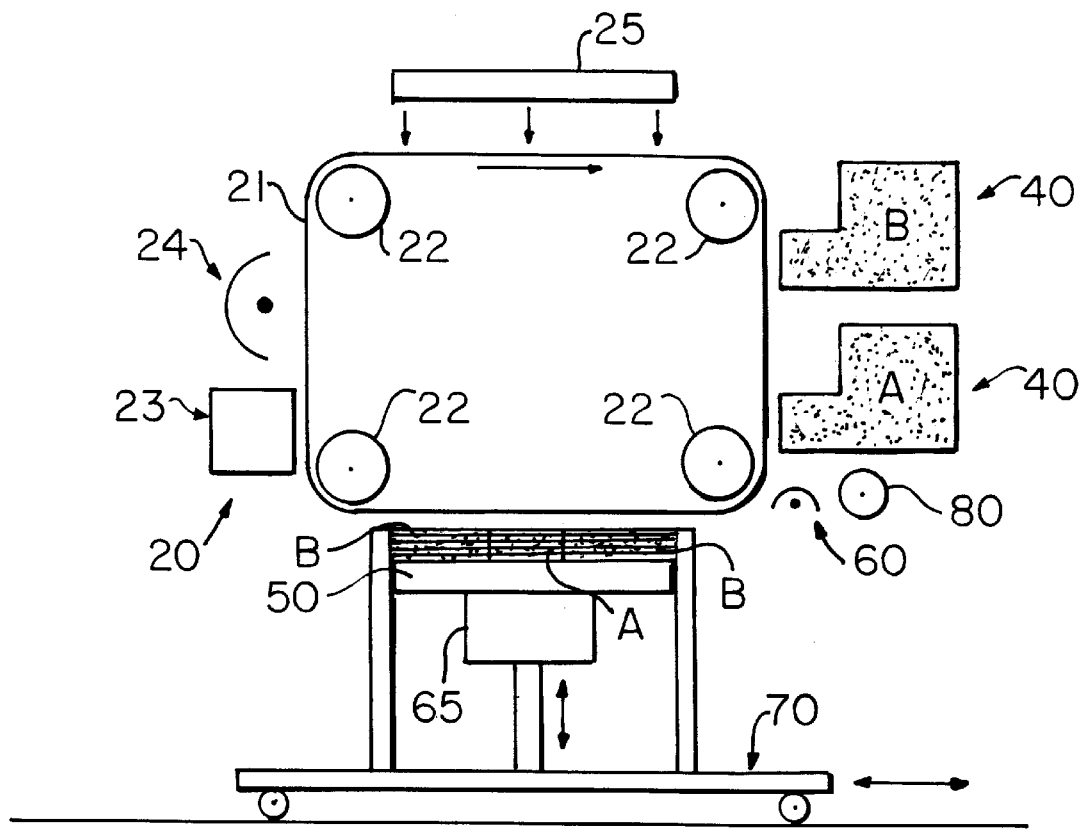
FIG. 1 illustrates an embodiment of the invention utilizing a photoreceptor belt.
Figure 2:
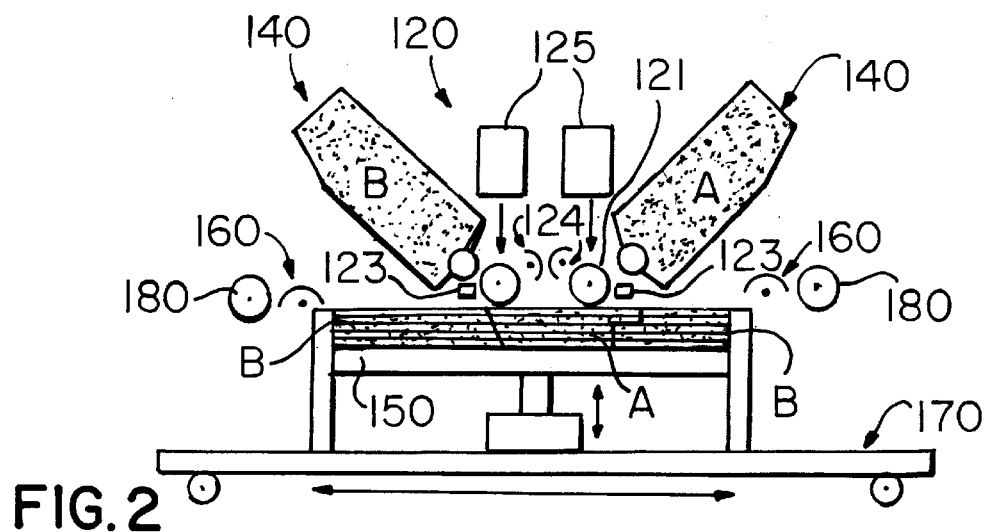
FIG. 2 is an alternative embodiment of the invention utilizing photoreceptor rollers.

The invention utilizes electro-photographic powder deposition means 20 to deposit successive layers of loose particles to create a green object suitable for later processing such as sintering or the like to solidify the object, with alternative embodiments of the apparatus illustrated in FIGS. 1 and 2. FIG. 1 shows the invention as incorporating the well known continuous belt type design for an electro-photographic powder transfer apparatus and FIG. 2 shows the invention as incorporating the equally well known roller type design for an electro-photographic powder transfer apparatus. The most common examples of an apparatus utilizing the illustrated mechanisms are photocopiers or laser printers.

Figure 6:
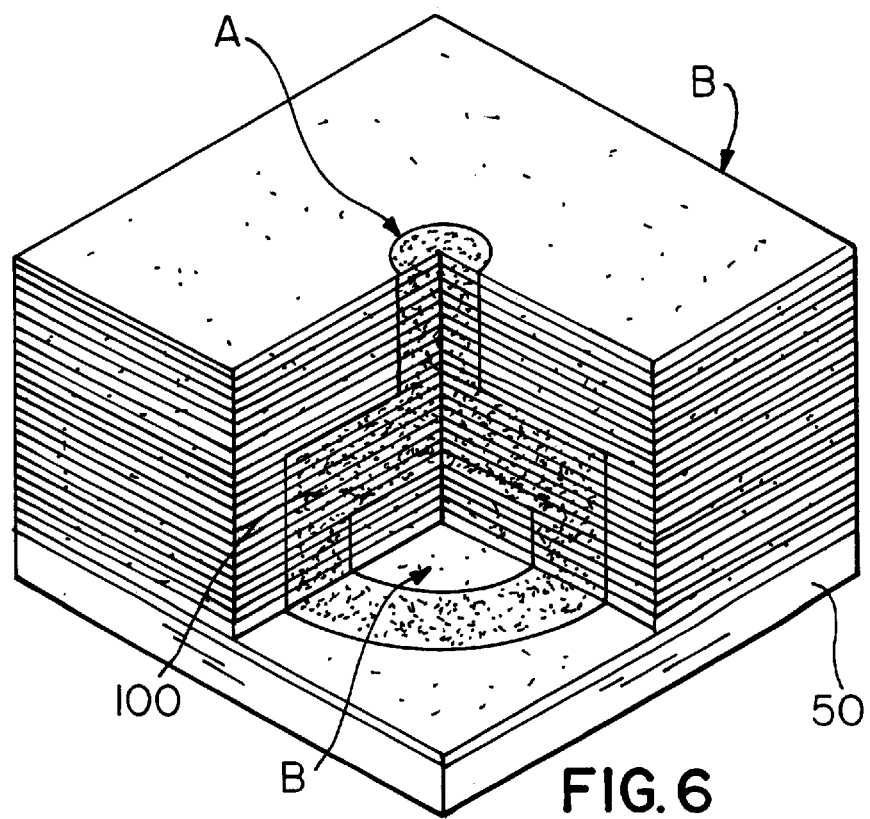
FIG. 6 illustrates a three dimensional part surrounded by support powder after deposition of all layers.

As seen in FIG. 6, a green or uncured three-dimensional part 100 may be created by depositing successive layers of at least two powders, designated powder or particulate material A and powder or particulate material B, on a build platform 50. The height of each individual layer in the figure is greatly exaggerated for clarity. Material A is the part compositional powder, the powder that will form the completed three-dimensional part or object after processing. Material B is the support powder, powder that does not become a component of the final part. As the powders A and B are deposited in successive layers, the three-dimensional part configuration is defined, and any raised or overhanging areas of material A are supported by one or more layers of material B deposited previously to the deposition of the next material A layer. Material B is chosen to have a relatively high melting point in relation to material A. Thus, after all the layers have been deposited, the green part can be compacted and sintered at a temperature below the melting point of material B. Material A will fuse to form the final part while material B will remain in powder form which can be easily removed. In effect, material B serves as a mold or die for material A.

Figure 3:
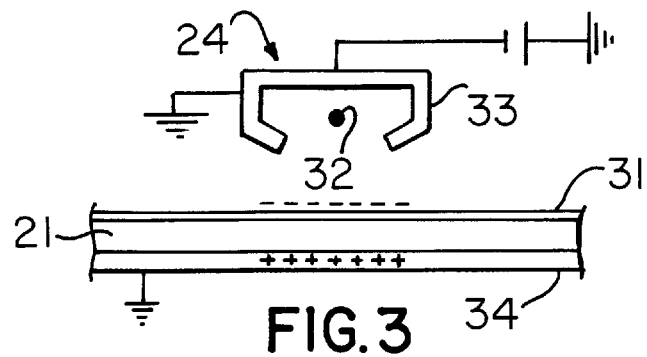
FIG. 3 is a detail illustrating an apparatus for charging the photoreceptor belt.

With reference to FIG. 1, the electro-photographic powder deposition means 20 is shown as a continuous loop photoconducting or photorecepting belt 21, with means 22 to drive the belt 21. The belt 21 is provided with a coating of photoreceptive material 31, as shown in FIG. 3, on one side of the belt. The photoreceptive material 31 is non-conducting unless exposed to a light source. The belt 21 is cleaned with each pass by a belt cleaner device 23, of a type known in the art which discharges the belt 21 by exposing it to a bright light and which removes any residual particles by brushing or scrapping means. The belt 21 is charged after each cleaning on each pass by a charging device 24, also of a type known in the art. Charging device 24, as shown in FIG. 3, may comprise a corona charging device where a high voltage is applied between a corona wire 32 and a shield 33. This ionizes the atmosphere near the wire 32, such that the ions having the same polarity as the wire 32 are repelled toward the photoconducting surface 31 of the belt 21. The attraction is enhanced by providing a ground plate 34 on the opposite side of the belt 21.

Figure 4:
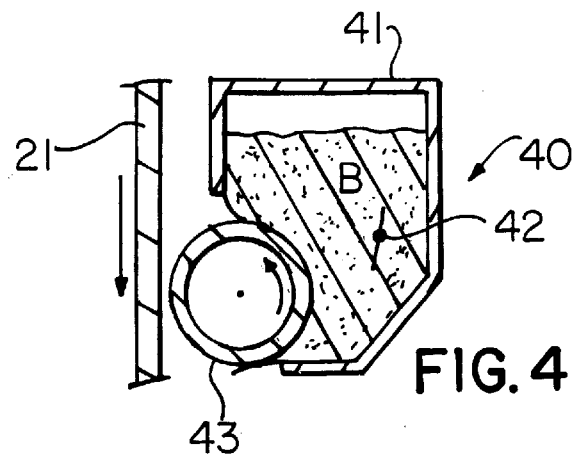
FIG. 4 is a cross-sectional detail illustrating a powder reservoir for application of the powder onto the photoreceptor belt or roller.

The charged photoreceptor belt 21 is then passed before an image projector 25, which creates a latent image of the desired cross-section of the part, either a negative or positive cross-section depending on whether material A or material B is to be deposited, by projecting light onto the region to be discharged. The image may be formed in known manner using CRT displays or lasers, as in a laser printer. The belt 21 is then moved so as to pass by or near one of at least two image powder delivery devices 40 containing the powder to be deposited, as shown in FIG. 4. The powder delivery devices 40 comprises a reservoir 41 to retain the powder, with a mixer 42 and roller 43 to supply a layer of the powder to the belt 21. The powder is electrostatically charged, such that it is attracted onto the charged regions of the latent image formed on the belt 21 by image projector 25. Common methodologies for effecting transfer of the powder to the belt 21 include the use of magnetic brush technology for powder delivery, with triboelectric charging of powder, induction charging for conducting powders or injection charging for non-conducting powders. This creates a real image on the belt comprising a uniform layer of temporarily adhered loose powder A or B.

A two pass approach may be used where in each pass a different developer device 40 will engage with the photo-conducting belt 21 and deposit a different powder. The powder delivery device 40 chosen for use in a particular application must take into account whether the powder is conductive or insulative, magnetic or non-magnetic. It is also possible to design the powder delivery devices 40 such that the different powders can be deposited in a single pass of the belt 21. Depending on the charge induced in the powder and the photoreceptor coating 31, the powder can be made to adhere to the charged or the discharged region. By charging the two powders to different polarity and applying a suitable biasing electric field, one powder can be deposited to adhere to the charged area (a process known as charged area development or CAD) while the other powder is deposited to adhere to the discharged region (discharge area development or DAD).

The powders A and B are deposited on the previously deposited layers on a build platform 50 which provides for precise alignment. The platform 50 moves up and down so that when the real image is brought into the correct position, the platform 50 can be moved into a near-contact position with the belt 21 to remove the powders from the belt and create the next layer The image area of the belt 21 then passes into the belt cleaner device 23 and the process is repeated. For example, in the first pass material B is deposited onto the previously deposited powder layer (or the base platform 50 if it is the first layer), and on the second pass material A is deposited on the previously deposited powder layer to create a single layer composed of materials A and B. As each successive layer of materials A and B is deposited, the three dimensional shape of the green part 100 is progressively defined, with material A comprising the part and material B comprising the mold or support means. The building platform 50 lowers incrementally for each layer, such that the uppermost layer is always at the proper distance from the belt 21.

In order to effect transfer of the powder materials A and B from the belt 21 to the previously deposited powder layer or platform 50, it is necessary to provide the surface of the previously deposited layer with a charge opposite to the charge of the powder forming the image on the belt 21 and of greater attractive strength than the attraction between the powder on the belt 21 and the photoreceptor material 31, such that the powder of the transferable powder image will be drawn from the belt 21 onto the previously deposited powder layer. Where the previously deposited powder is electrically conductive, this opposing charge may be created by a voltage-providing means 65 connected to the base platform 50 for passage of the correct voltage into the conductive powder already deposited. Where the powder is non-conductive, a surface charging means 60 is provided to create the proper charge on the previously deposited layer. Surface charging means 60 as shown may comprise a corona charging device of common known design, which comprises structure similar to that shown for belt charging means 24 in FIG. 2. Translation means 70, such as for example a powered shuttle system with wheels or rollers, is provided for moving the platform 50 laterally beneath the surface charging means 60 after each layer is deposited in order to properly charge the surface, after which the platform 50 is returned to the proper position under the electro-photographic powder deposition means 20. Alternatively, the invention could be structured such that the platform 50 remains stationary and the electrophotographic powder deposition means 20 and surface charging means 60 move reciprocatingly across the platform 50.

In rare instances there may be enough attraction between successive powder layers such that particles will not be drawn from the surface layer onto the powder image of the belt 21, but in most cases it will be necessary to provide compaction, fusion, or fusion and compaction means to adhere each deposited powder layer to the previously deposited powder layer, referred to herein collectively as fusion/compaction means 80, such as for example a heat roller, to provide green strength to each powder layer as it is deposited so that the surface layer will remain adhered to the previously deposited underlying layers. As the platform 50 is translated laterally, the compaction or fusion/compaction means 80 contacts the last deposited powder layer and bonds it to the underlying powder layer. This compacted, fused, or fused and compacted, surface layer is then properly charged by the surface charging means 60 before being re-positioned beneath the powder deposition means 20. Alternatively, the surface layer may be made to adhere to the underlying layer by application of an adhesive which is later burned off or dissolved, by using support powder with an adhesive coating, or by using powder coated with a material that fuses and bonds the particles together at relatively low temperature where the coating burns off during subsequent sintering of the green part. In this way the surface layer remains adhered to underlying layer and the image powder on the belt 21 will be drawn from the belt during the deposition step.

In the alternative, a part or object may be created from a single powder material A without recourse to the use of a second support or mold powder material B. Each successive layer of the green part is deposited as explained above, with the material A being applied to the belt 21 in the proper image and transferred to the previously deposited powder layer, the previous layer having been fused to the preceding layer and properly charged by translation of the platform 50 beneath the fusion/compaction means 80. In the event that the layer to be deposited is not fully supported by the previously deposited layer, then secondary bracing or support structures must be constructed to support any overhang (as done in many single material solid freeform processes such as FDM and stereolithography). Thus the complexity of the part to be created is much limited in the single powder method.

Figure 5:
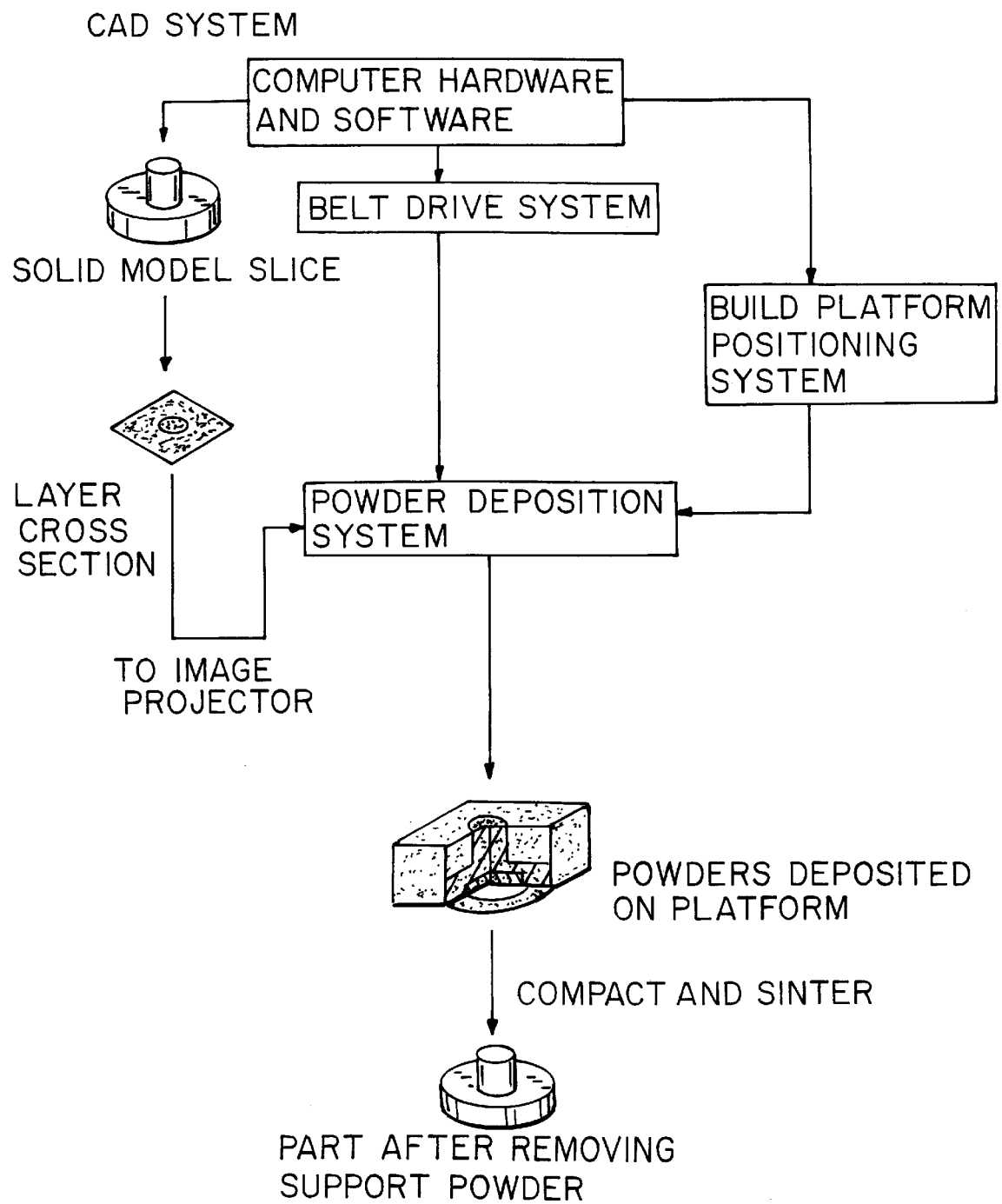
FIG. 5 is a schematic illustrating the system integrated with CAD software.

It is preferred that the system be integrated with computer aided design (CAD) software, as shown in FIG. 5. CAD software can be used to create very precise, unambiguous solid models of a part on a computer. Such solid models would then serve as the input data for the SFF system. This is an improvement in that most SFF systems require the model to be converted into stereolithographic (STL) format in which the surfaces of the solid are broken into triangular facets and this collection of facets are used to represent the solid. These STL files often have errors that make it difficult to use. With CAD, the software can create a solid model or read in a STL file as input and automatically generate the cross-sectional images of the part for each layer of powder deposition. The system has to be computer controlled to synchronize the image projection, powder deposition and belt or drum movements.

In an alternative design shown in FIG. 2, the electro-photographic powder deposition means 120 comprises a pair of photoreceptor or photoconductor rollers or drums 121, each associated with separate image projectors 125, charging devices 124 and powder delivery devices 140, one for material A and the other for material B. The drums 121 are cleaned and charged in similar manner to the belt 21, an image is projected onto the drum surface using laser beams, powder is deposited onto the charged image areas of the drum 121, the transferable powder image on the drum 121 is then rolled over the previously deposited layer so that the powder is transferred onto the layer. A pair of surface charging means 160 and fusion/compaction means 180 are provided at opposite sides of the platform 150, which is movable in a reciprocating manner by translation means 170. For electrically conductive powders, electrical circuitry means 165 to provide a proper voltage to the platform 150 is provided. The operation of the components are generally as set forth previously, but because drums 121 are utilized the platform 150 must be translated at the same relative rate as the surface of the rotating drums 121 during powder deposition. For the two powder system, a layer is created for example by first transferring material A from a first drum 121 onto the previously deposited layer. The platform 150 is then translated to pass the newly deposited layer beneath the fusion/compaction means 180 to secure this newly added layer to the previously deposited layer. This compacted, fused, or fused and compacted, layer is then passed under the surface charging means 160 to be given the proper charge to insure the deposition of the next powder image from the drum 121. If the powder is non-conductive it is then properly charged by surface charging means 160 as the platform 150 returns beneath the electro-photographic deposition means 120, where material B is transferred to the surface by the other drum 121, the two drums 121 rotating in opposite directions. The platform 150 is then fully translated in the opposing direction to pass beneath the other set of fusion/compaction means 180 and surface charging means 160 for proper treatment of the material B layer. This cycle is then repeated continuously, with the platform 150 lowering a distance equal to the depth of each layer in order to build the three dimensional part vertically.

Post-processing steps may be required after the three dimensional part is constructed in order to induce higher density, strength and toughness to the part, such as for example additional compacting and sintering. Where this type of post-processing occurs, the initial design dimensions must be chosen to compensate for shrinkage.

This invention allows for extremely precise powder deposition parameters. Powders of particle size in the range of 5 to 20 microns may be utilized. The technology is easily capable of resolution on the scale of 600 dots per square inch. This enables very precise parts to be produced within very small engineering tolerances, as well as enabling the technology to be applied to the creation of minute electronic circuits (where conducting powders layers are interspersed in non-conducting powder layers), micro-machines and other small scale objects. The process is suitable for use with metal, ceramic or polymer powders. Composite and gradient parts with precisely controlled composition throughout the object can be created using grey scale techniques well known in electrophotography. To create materials the two constituent powders used in the composite are printed in each layer over each other in different grey scales such that any individual layer may comprise these two distinct powders present in any desired ratio (from 1:99 to 99:1) and physically dispersed in the layer at precisely chosen locations to create any desired pattern of distribution.

It is understood that equivalents and substitutions of certain elements and components set forth above may be obvious to those skilled in the art, and the full and true scope of the invention therefore is to be as set forth in the following claims.

I claim:

1. A solid freeform fabrication method for constructing a three dimensional object through successive layer-by-layer deposition of powder comprising the steps of:

(a) providing electrophotographic powder deposition means to create a transferable powder image, and creating said transferable powder image;

(b) providing a platform to receive said transferable powder image;

(c) transferring said transferable powder image to said platform to create a deposited powder layer;

(d) providing another transferable powder image;

(e) providing means to charge said deposited powder layer such that said deposited powder layer is charged opposite to said another transferable powder layer, and charging said deposited powder layer;

(f) transferring said another transferable powder image onto said deposited powder layer previously transferred to create another deposited powder layer;

(g) repeating steps (d) through (f) to construct a three dimensional object.

2. The method of claim 1, further comprising providing means to adhere said another deposited powder layer to said deposited powder layer previously transferred, and adhering said another deposited powder layer to said deposited powder layer previously transferred, where said adhering step is repeated whenever steps (d) through (f) are repeated.

3. The method of claim 2, where said means to adhere comprises compaction means.

4. The method of claim 2, where said means to adhere comprises fusion means.

5. The method of claim 2, where said means to adhere comprises combined compaction and fusion means.

6. The method of claim 1, where said electrophotographic powder deposition means creates a transferable powder image from more than one powder.

7. The method of claim 6, where said more than one powder comprises a part powder and a support powder, said part powder having a melting temperature lower than said support powder.

8. The method of claim 2, where said electrophotographic powder deposition means creates a transferable powder image from more than one powder.

9. The method of claim 2, where said more than one powder comprises a part powder and a support powder, said part powder having a melting temperature lower than said support powder.

10. The method of claim 1, where said charging means comprises means to apply a voltage to said platform.

11. The method of claim 1, where said charging means comprises a corona discharge device.

12. The method of claim 2, where said charging means comprises means to apply a voltage to said platform.

13. The method of claim 2, where said charging means comprises a corona discharge device.

14. The method of claim 6, where said charging means comprises means to apply a voltage to said platform.

15. The method of claim 6, where said charging means comprises a corona discharge device.

16. A solid freeform fabrication method for constructing a three dimensional object through successive layer-by-layer deposition of powder comprising the steps of:

(a) providing electrophotographic powder deposition means to create a transferable powder image, and creating said transferable powder image;

(b) transferring said transferable powder image to create a deposited powder layer;

(c) providing another transferable powder image;

(d) providing means to charge said deposited powder layer such that said deposited powder layer is charged opposite to said another transferable powder layer, and charging said deposited powder layer;

(e) transferring said another transferable powder image onto said deposited powder layer previously transferred to create another deposited powder layer;

(f) repeating steps (c) through (e) to construct a three dimensional object.

17. The method of claim 16, further comprising providing means to adhere said another deposited powder layer to said deposited powder layer previously transferred, and adhering said another deposited powder layer to said deposited powder layer previously transferred, where said adhering step is repeated whenever steps (c) through (e) are repeated.

18. An apparatus for solid freeform fabrication for constructing a three dimensional object through successive layer-by-layer deposition of a transferable powder image onto a previously deposited powder layer, the apparatus comprising:

(a) electrophotographic powder deposition means which creates plural deposited powder layers, said electrophotographic powder deposition means comprising a photoreceptor transfer member, means to create a charged image on said photoreceptor transfer member, means to deliver a powder to said photoreceptor transfer member where said powder adheres to said image to create a transferable powder image, and means to clean said photoreceptor transfer member after transferring said transferable powder image, where said electrophotographic powder deposition means creates a deposited powder layer on a previously deposited powder layer;

(b) means to receive said deposited powder layer; and (c) means to charge said deposited powder layer to a charge opposite to the charge of said transferable powder image.

19. The apparatus of claim 18, further comprising means to adhere said deposited powder layer to said previously deposited powder layer.

20. The apparatus of claim 18, where said receiving means comprises a platform which is translatable vertically.

21. The apparatus of claim 20, further comprising translation means to move said platform laterally.

22. The apparatus of claim 18, where said electrophotographic powder deposition means comprises a belt.

23. The apparatus of claim 18, where said electrophotographic powder deposition means comprises a drum.

24. The apparatus of claim 18, where said electrophotographic powder deposition means comprises means to deliver different powders to said photoreceptor transfer means.

25. The apparatus of claim 19, where said adhering means comprises a compaction roller.

26. The apparatus of claim 19, where said adhering means comprises a hot roller.

27. The apparatus of claim 18, where said deposited layer charging means comprises a voltage-providing means.

28. The apparatus of claim 18, where said deposited layer charging means comprises a corona discharge device.

* * * * *

UNITED STATES PATENT AND TRADEMARK OFFICE
CERTIFICATE OF CORRECTION

PATENT NO. : 6,066,285
DATED : May 23, 2000
INVENTOR(S) : Kumar

It is certified that error appears in the above-identified patent and that said Letters Patent is hereby corrected as shown below:

Title page,
Item [54], Title of Invention: Please correct title to read -- Solid Freeform Fabrication Using Powder Deposition --, with the term Powder replacing the incorrect term Power".

Column 1,
Line 2, "Power" should read -- Powder --

Signed and Sealed this

Twenty-eighth Day of August, 2001

Attest:

*Nicholas P. Godici*

NICHOLAS P. GODICI
*Attesting Officer*    *Acting Director of the United States Patent and Trademark Office*